United States Patent [19]

Bunker et al.

[11] Patent Number: 4,714,428

[45] Date of Patent: Dec. 22, 1987

[54] METHOD OF COMPREHENSIVE DISTORTION CORRECTION FOR A COMPUTER IMAGE GENERATION SYSTEM

[75] Inventors: William M. Bunker; Donald M. Merz, both of Ormond Beach, Fla.

[73] Assignee: General Electric Company, Philadelphia, Pa.

[21] Appl. No.: 9,649

[22] Filed: Jan. 28, 1987

Related U.S. Application Data

[63] Continuation of Ser. No. 810,737, Dec. 19, 1985, abandoned.

[51] Int. Cl.⁴ ................................................ G09B 9/00
[52] U.S. Cl. ................................... 434/43; 340/723
[58] Field of Search ........................... 434/43; 340/723

[56] References Cited

U.S. PATENT DOCUMENTS

| | | | |
|---|---|---|---|
| 4,550,315 | 10/1985 | Bass et al. | 340/723 |
| 4,590,465 | 5/1986 | Fuchs | 340/723 |
| 4,656,521 | 4/1987 | Trzeciak et al. | 358/321 |

Primary Examiner—Leo P. Picard
Attorney, Agent, or Firm—Stephen A. Young; Paul Checkovich

[57] ABSTRACT

A method for computer image generation producing simulated visual scenes for applications such as flight training, employing a comprehensive distortion correction to generate the image takes place in three sequential stages: Controller, Geometry Processor, and Display Processor. The Display Processor generates video to produce the desired scene on the raster of the display device. If the scene is projected through a wide-angle lens and/or is projected onto a curved screen, the combination of optical and geometric distortion presents a highly distorted scene to the viewer. The comprehensive distortion correction method produces a precisely predistorted scene on the projector raster so it appears valid to the viewer. Mapping between projector space and viewer space is highly nonlinear. However, a small region of the display (span) is selected sufficiently small so that the projector/viewer transformation may be considered linear. The Geometry Processor defines face edges in viewer space and maps edge vertices into projector space. In the Display Processor detection of spans intersected by a given face is done in viewer space using the mapped span corners and edge coefficients defined by the Geometry Processor. Edge to span corner distances are determined in viewer space. This produces a piecewise linear approximation to the curves which exact mapping would provide. The edges are continuous at span boundaries and have slope discontinuities so small as to be imperceptable. The resulting scene appears fully valid to the viewer, with all distortions corrected.

38 Claims, 28 Drawing Figures

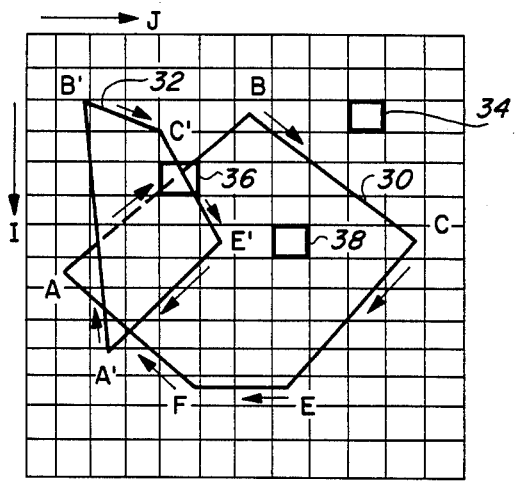
FIG-3
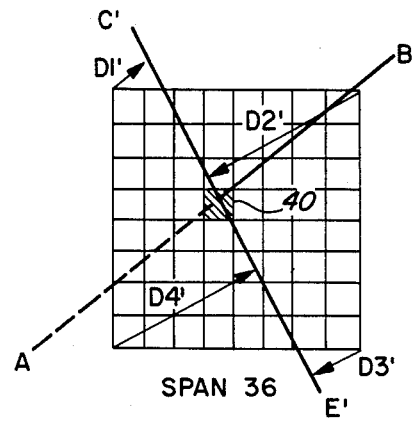
FIG-4
| SEARCH DIRECTION TABLE ||||
|---|---|---|---|
| D AT SPAN CORNERS |||  SEARCH DIRECTION |
| 1 | 2 | 3 | 4 |
| 1 | 2 | 3 | 4 | |
|---|---|---|---|---|
| − | − | + | + | |
| + | − | + | + | E (EAST) |
| − | − | + | − | |
| 0 | 0 | + | + | |
| + | + | − | + | |
| + | − | − | + | S (SOUTH) |
| − | − | − | + | |
| 0 | − | − | 0 | |
| + | + | − | − | |
| + | − | + | − | W (WEST) |
| + | + | + | − | |
| 0 | 0 | − | − | |
| − | + | + | − | |
| − | + | + | + | N (NORTH) |
| − | + | − | − | |
| 0 | + | + | 0 | |
| − | 0 | + | 0 | |
| − | 0 | + | + | NE (NORTH-EAST) |
| − | 0 | + | − | |
| 0 | − | 0 | + | |
| + | − | 0 | + | SE (SOUTH-EAST) |
| − | − | 0 | + | |
| + | 0 | − | 0 | |
| + | − | − | 0 | SW (SOUTH-WEST) |
| + | + | − | 0 | |
| 0 | + | 0 | − | |
| 0 | + | − | − | NW (NORTH-WEST) |
| 0 | + | + | − | |
FIG-5A
| DIRECTION KEY |||
|---|---|---|
| NW | N | NE |
| W | 1   2<br>PRESENT SPAN<br>4   3 | E |
| SW | S | SE |
FIG-5B

SPAN 36

VIEWER SPACE

SPAN 36

PROJECTOR SPACE

SPAN 36

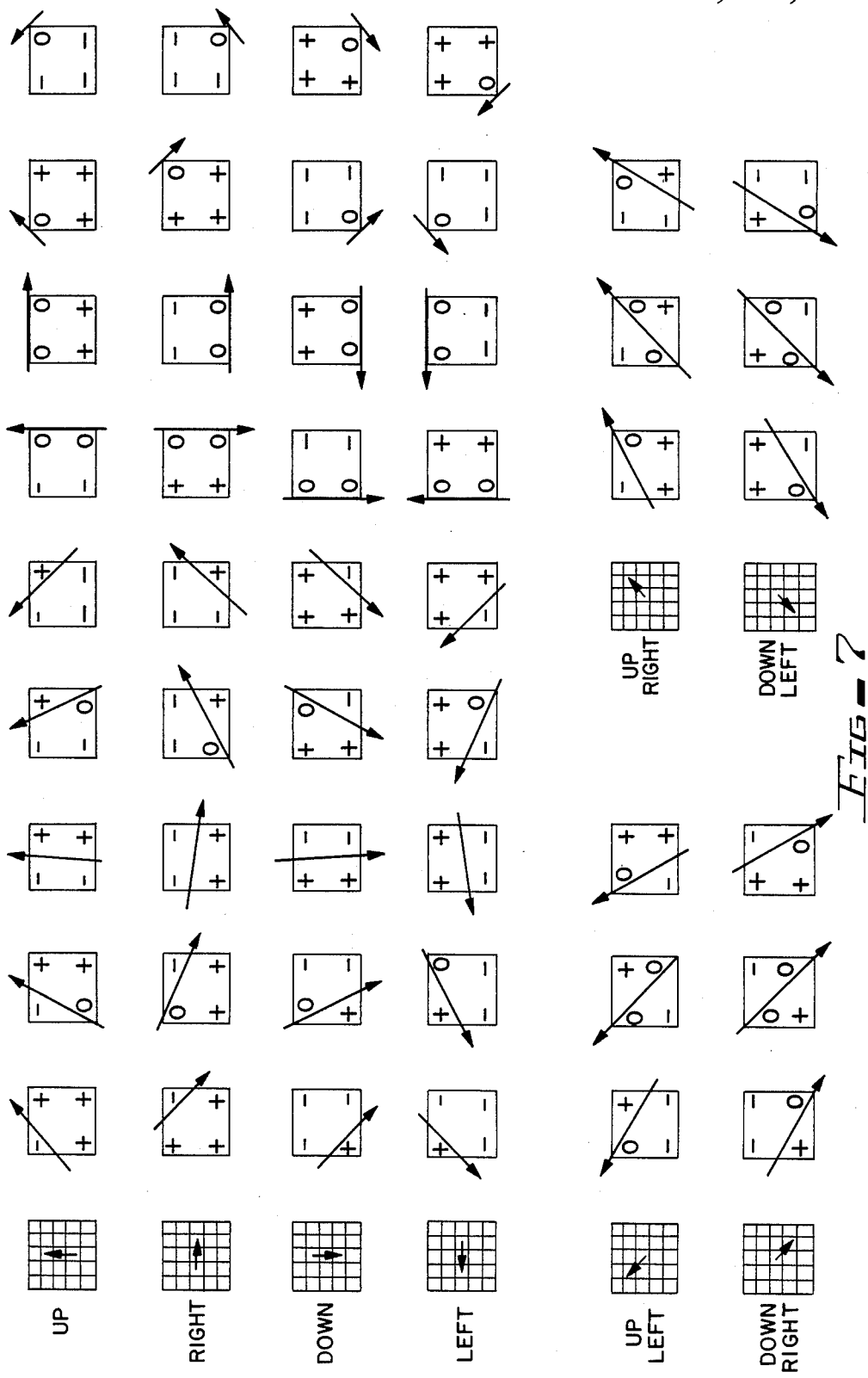

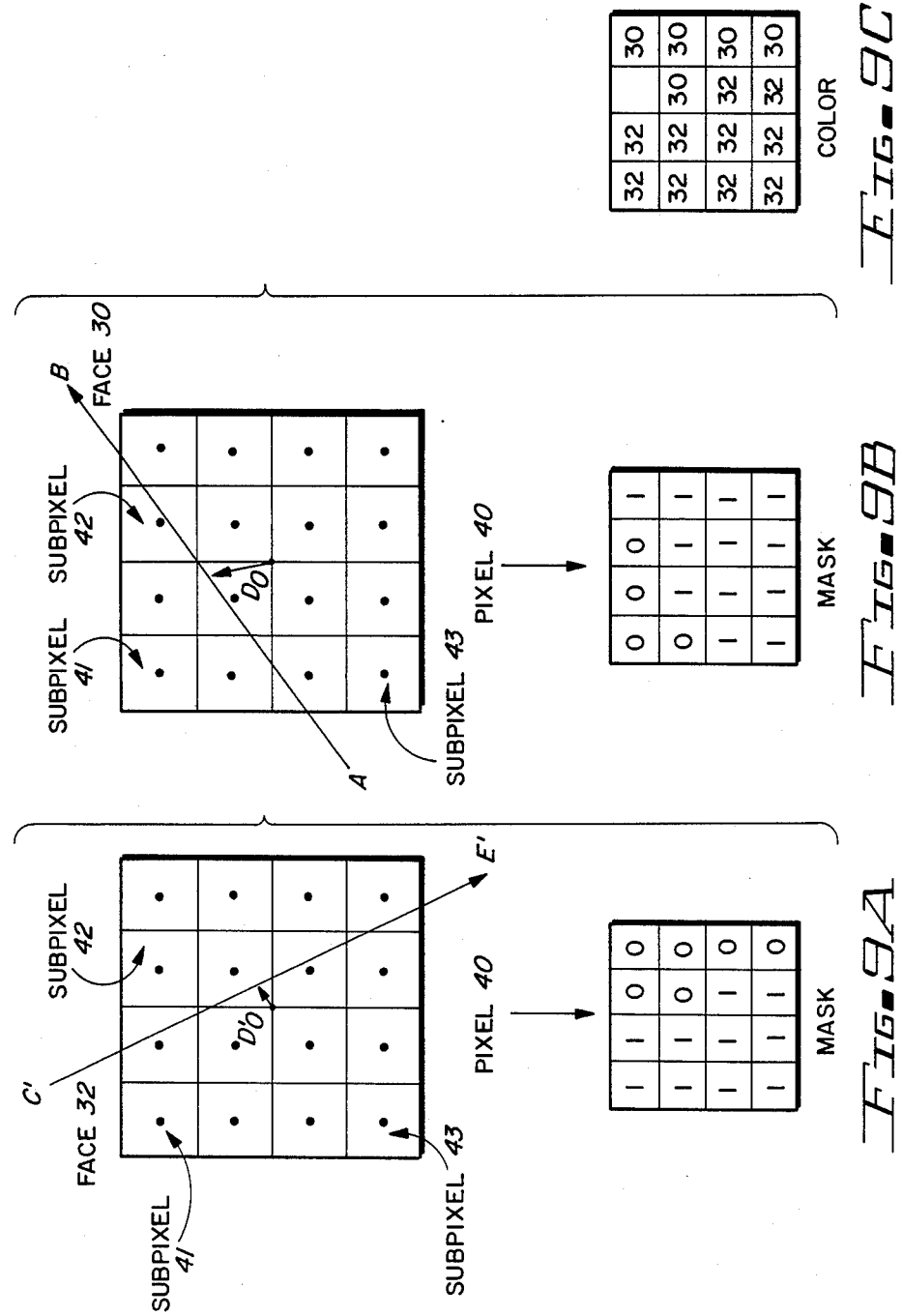

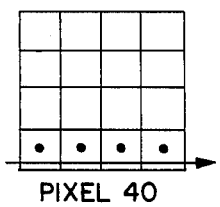 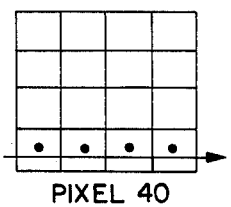 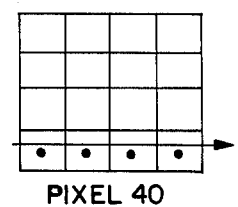
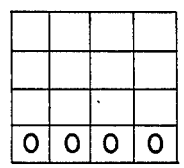 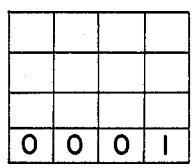 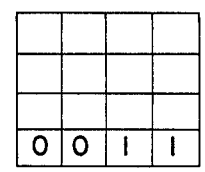
Fig_10A     Fig_10B     Fig_10C
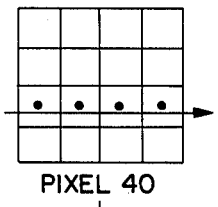 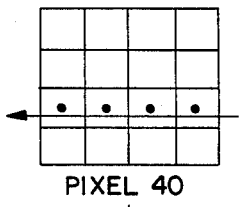
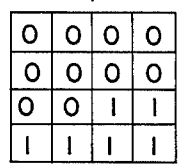 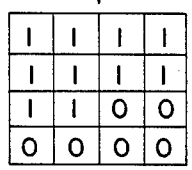
Fig_10D     Fig_10E
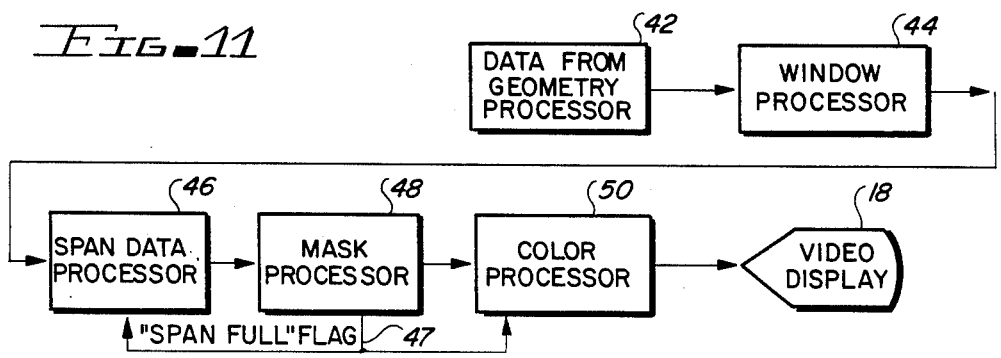
Fig_11

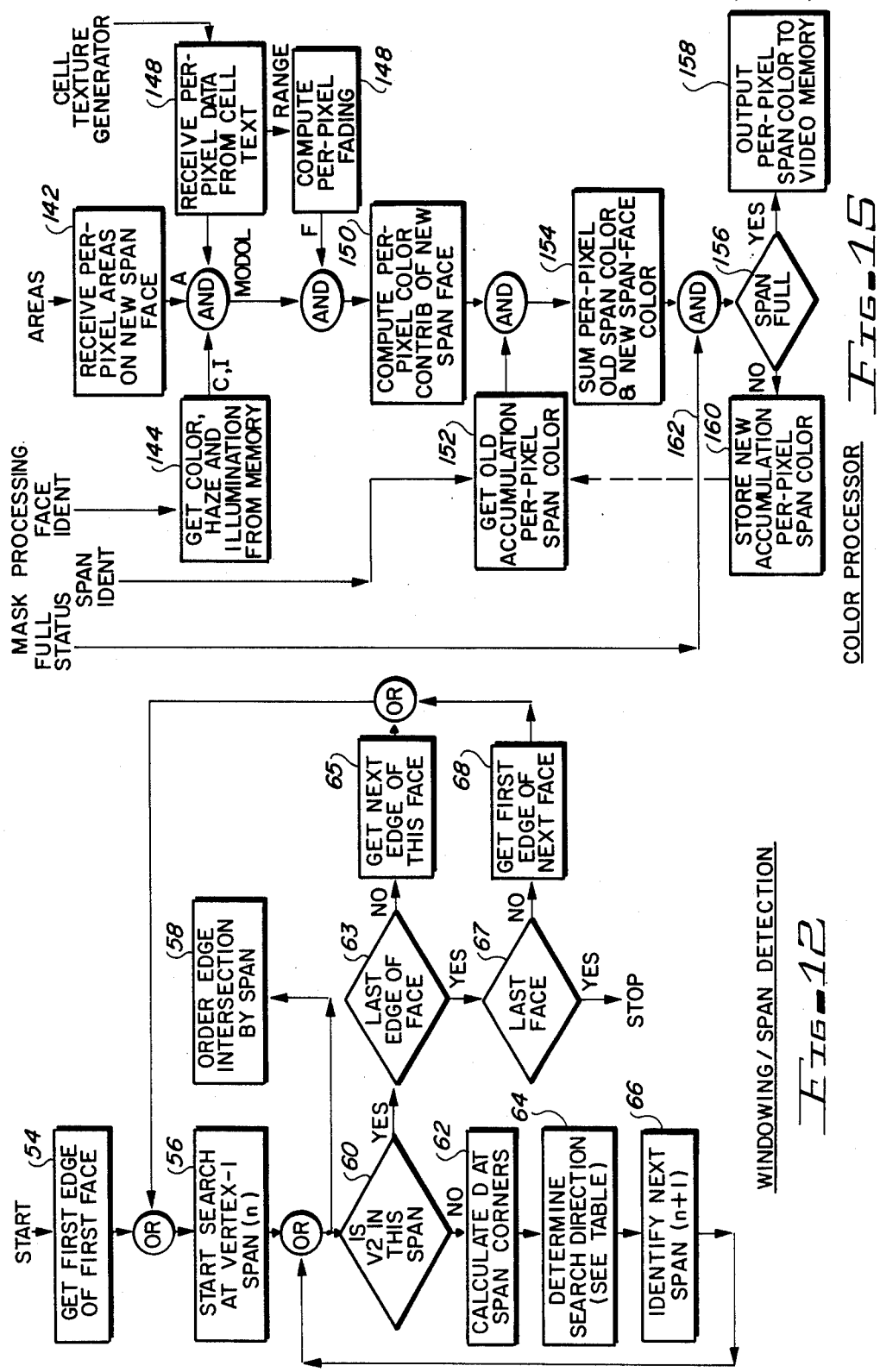

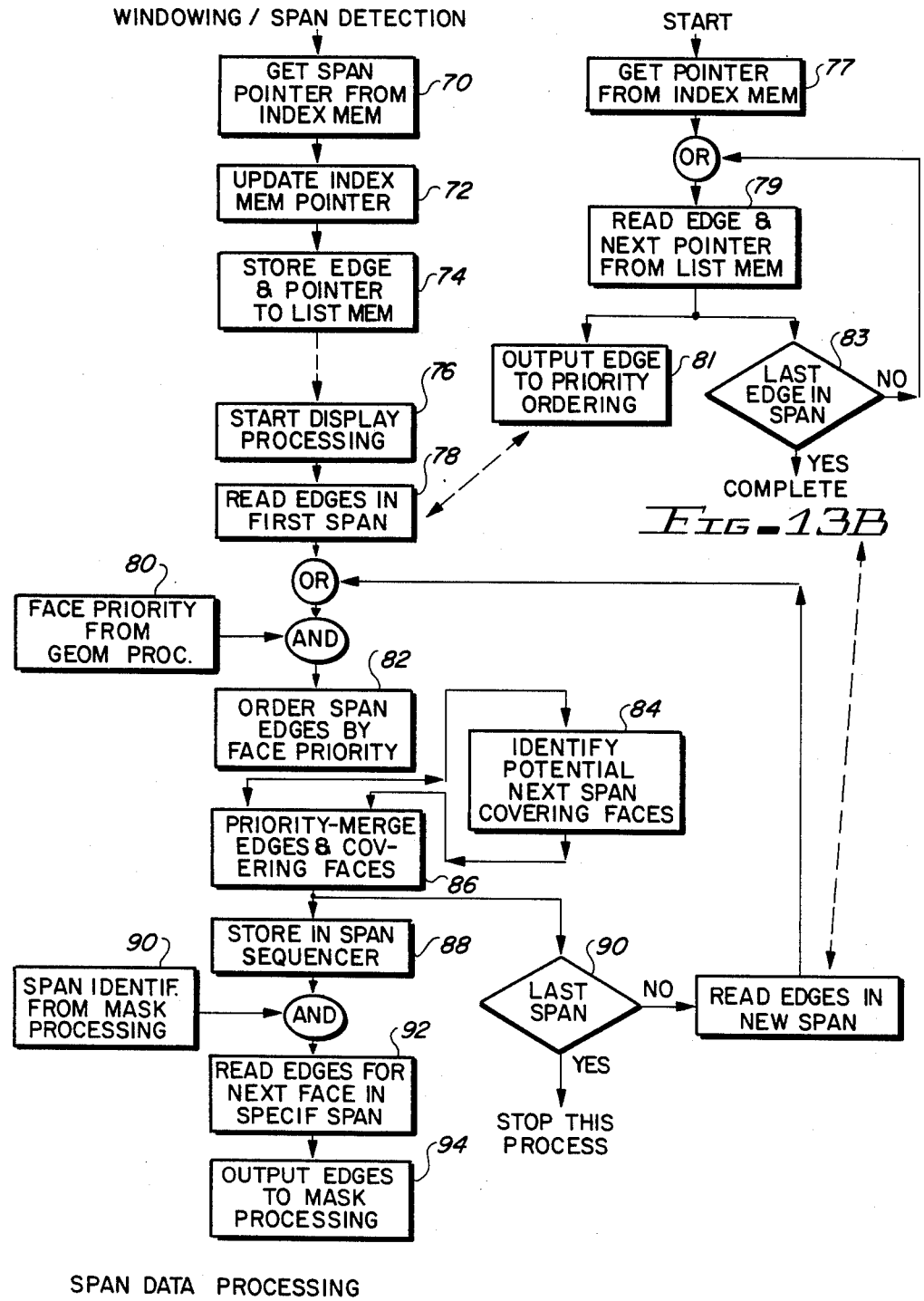

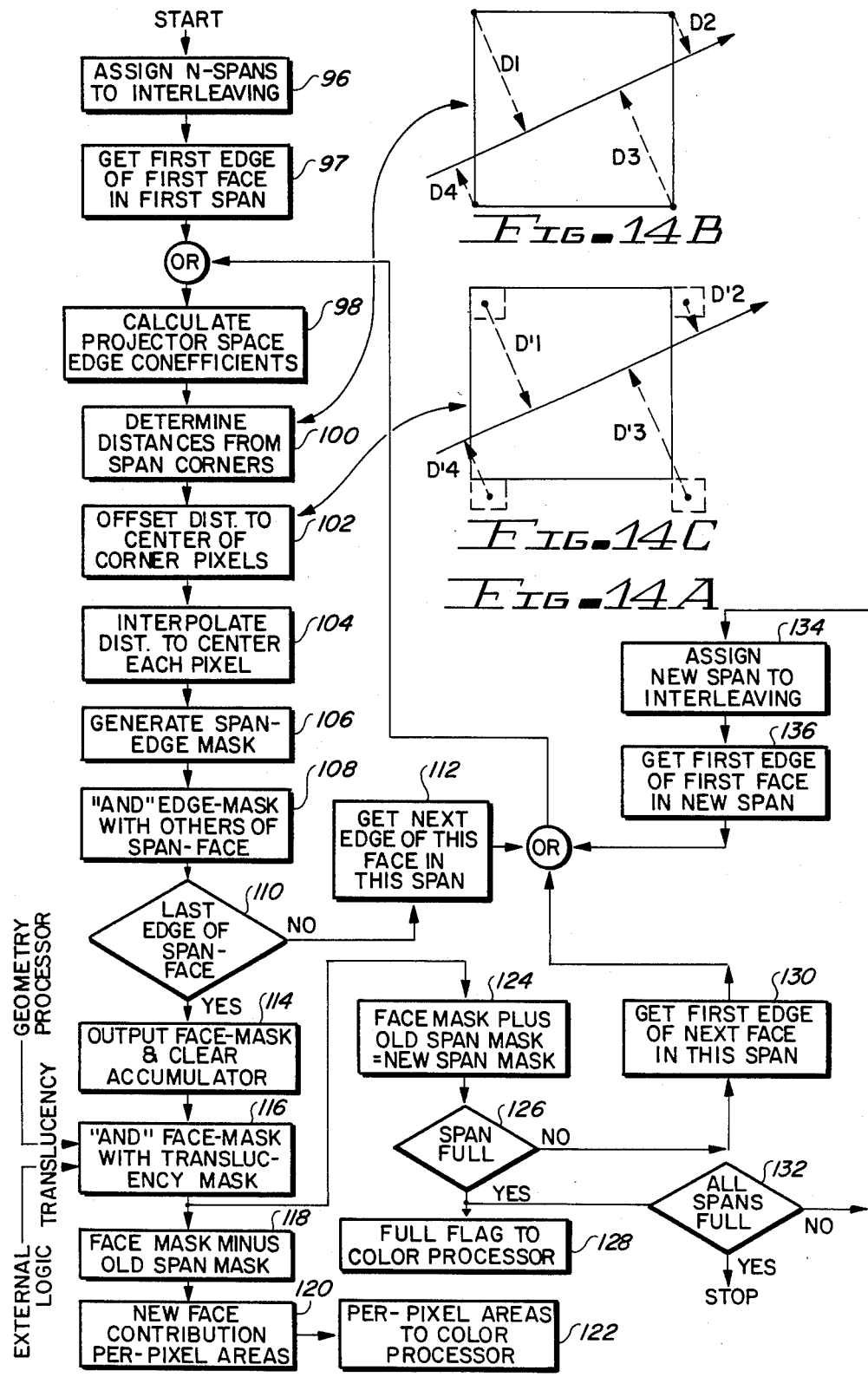

METHOD OF COMPREHENSIVE DISTORTION CORRECTION FOR A COMPUTER IMAGE GENERATION SYSTEM

This application is a continuation of application Ser. No. 810,737, filed Dec. 19, 1985, now abandoned.

FIELD OF THE INVENTION

This invention relates generally to the field of computer image (CIG) systems, and more particularly, it relates to area processing of an image comprised of faces employing a comprehensive distortion correction for use in real time imaging systems.

BACKGROUND OF THE INVENTION

Real-time computer image systems are being designed to provide realistic image reproduction for a variety of simulator systems, such as tank simulators and flight simulators. Such simulators are used as training devices which permit a combatant to obtain practice without the necessity of going out into the field and using the actual combat systems. They enable a user, such as a pilot or tank gunner, to maintain and improve his skills without the cost associated with live training. It is thus very advantageous to provide the user with video display realism which is beneficial for training and practice purposes.

In a typical real time computer image generation system, such as a flight simulator system, image generation can be broken into three separate processing stages: Controller, Geometry Processor, and Display Processor. These three processing stages or sections each work independently on data representative of or corresponding to one of three consecutive scenes to be displayed. The Controller processes data on a scene or image for a fixed time, which may be either a field time of 16.67 milliseconds or a frame time of 33.3 milliseconds, usually the former, and then passes its processed data to the Geometry Processor. This particular field and frame time corresponds to that time for a typical television format display, i.e., two interlaced fields per frame with thirty frames per second. The Geometry Processor has an equal time to do its calculations and at the end of that time its results are sent to the Display Processor. The Display Processor always processes one interlace field for a video display in one field time. For each time interval, all three processors are kept busy, so at any given time the processors are working on three separate scenes. Each section processes inputs and generates outputs during the interval, so data flows through the three stages in a sequential manner. The computational load is spread out among the specialized processor sections, so this allows new scenes to be displayed each field or frame time, even though the results are delayed three fields or frames.

For example, in a flight simulator system, pilot inputs are received by the Controller and after being processed sequentially by the Controller, the Geometry Processor and Display Processor, the output is sent as a color scene to video displays observed by the pilot in the simulator. The data seen by the pilot starts out as simple contrtol inputs applied to an environment definition and is converted to pixel video display information. In the Controller, the pilot inputs are used to calculate the new position and orientation of the aircraft, and from this, a mathematical rotation matrix is calculated that is used to rotate objects from the reference coordinate system to a display coordinate system. Any other information dealing with the aircraft, with the position of targets and with other aircraft is also calculated in the Controller. In some applications, the Controller is a general purpose computer.

The Geometry Processor reads, from a database, descriptions of objects that are potentially visible in the stored three dimensional digital representation of the scene. The objects that are read are rotated into display coordinates using the rotation matrices calculated in the Controller. Edges of these three-dimensional objects are clipped by the Geometry Processor if they extend beyond the view window boundaries. The Geometry Processor mathematically projects the three-dimensional data onto the two-dimensional display window. Object faces which extend beyond display window boundaries are then clipped in two-dimensional image space. In addition, the Geometry Processor calculates which objects are in front or behind other objects and stores this information in a priority list. Each object processed is made up of individual faces, where each face is in the form of a polygon bounded by straight edges. The priority list contains the order of all faces in the scene, with the first face in the list as the highest priority face, and the last face in the list as the lowest priority face. Whenever two faces overlap on the display, the higher priority face will be visible, and the lower priority face will be obscured. Lastly, the Geometry Processor calculates the display end points for the line segments that bound the two dimensional faces, and also calculates the coefficients of the line equations that describe the bounding edges.

The Display Processor receives the two dimensional face descriptions, along with face color, face fading information, a face priority list, cell texturing, level of detail blending, translucency, curvature shading, etc; and uses this information to output the scene to a color display. Each color display in the system is typically made up of 1024 linees of video information, with each line having 1024 individual color dots or pixels. However, other combinations of lines and pixels per line are certainly possible. The Display Processor has to resolve, for each pixel, what the color of the pixel should be, given that many faces can be present in a pixel, and that certain portions of faces may be covered by other faces. Since there can be 1024 by 1024 pixels in the display, and all these need to be calculated in 1/60th of a second, the processing load in the Display Processor is very high. To calculate video for a multi-display system (a single system has contained as many as 14 displays), the Display Processor must perform in excess of 10 bilion computations per second. Due to the tremendous processing load, a Display Processor can drive only a few displays. In some systems, a single Controller and Geometry Processor can be used to drive several Display Processors with several displays connected to each Display Processor. The Display Processor therefore represents the majority of processing in a real time computer image generation system, and for this reason most of the effort to improve the capabilities and realism of a CIG system is concentrated in the Display Processor area.

One particular problem that decreases realism is the stair-step edge that occurs in a computer generated image. This happens because the edge on the video display is caused by the discrete changes in the pixel intensity inherent in digital data. One approach to improving a video scene realism and eliminating the stair-step effect is to process the area boundaries with geometric smoothing. In geometric smoothing an area calculation is made for each edge through a pixel. However, it was found that this method would give frequent glitches in the computer generation screen if more than two edges of a face pass through a pixel.

Many display systems, particularly those employing spherical or cylindrical screens, require that a predetermined image be computed and placed on a projection raster in order that the image seen by the viewer appear correct. In general a projector and a viewer will be at different locations. If a straight line is produced on the image source, the projection raster, and projected by a standard projection lens onto the screen, it will appear curved to the observer. This is referred to as geometric distortion. If a standard F Tangent Theta lens is used to project a wide field of view seen inside a spherical screen, there will be great variation in brightness and in resolution over the region covered. The use of an F Tangent Theta lens in which the angle, Theta, between the projector boresight and a projected ray is proportional to the distance between the center of the projector raster and the point on the raster that is the source of the ray, provides approximately uniform brightness and resolution. With such a lens, even if the projector and viewer were co-located, a scene correct on the projector raster would appear distorted to the viewer, that is, optically distorted.

It is, therefore, an object of this invention to provide a comprehensive distortion correction technique which results in a predistorted scene on a projector raster which when projected, looks correct to the viewer and simultaneously corrects the geometric distortion and optical distortion.

It is an object of the present invention to provide a method for Display Processor calculations that reduces the processing in a real time computer image generation system while decreasing the computational time of the Display Processor.

It is a further object to provide a method in which an unlimited number of edges can be processed through a pixel, to provide in real time a noise-free video display.

SUMMARY OF THE INVENTION

The present invention improves the realism of a computer generated video image by improving the capabilities of the Display Processor processing unit. The processing of faces through the Display Processor consists of four major tasks: span detection or windowing, span sequencing, mask processing, and color processing.

Span detection is the process of detecting spans intersected by an edge of a face. The edges of a face are tracked in a clockwise direction about the face, so that the face is always to the right, to identify spans which they intersect. Spans are small rectangular areas of the display which are fixed in size. A span is composed of a matrix of pixels, for example 8 scan lines by 8 pixels, and basically is fixed in position on a video display.

During span detection the set of spans that contain portions of a face is found and identified. Some spans on the boundary of face will contain only a small portion of the face and are identified and stored in a memory via a linked list. Other spans completely covered by a face are identified also, for latter processing in the mask processing task.

The span data preprocessor, which does the span sequencing, acts as a buffer and controller between the span detector and the mask processor. The span sequencer receives span data from the span detector and order the data in span lists. It assigns spans, in row sequence, to the mask processor. It then accesses the next feature of a span from the span detector and outputs it to the mask processor. When the processing of a span is complete, the mask processor notifies the span data preprocessor. The spand data preprocessor then assigns a new span to the sequence, and outputs the new span to the mask processor.

The faces which intersect or cover a span are processed one at a time to determine a per-pixel area contribution of the face to the generated scene. Faces in the span are processed in decreasing priority sequence in which case output from the span data preprocessor will stop with the output of a non-translucent covering face or when the span is full, whichever occurs first.

In the mask processing task, each pixel of a span is sampled as 16 subpixels, areas rather than points, to determine the area of a face that is visible within the pixel. A subpixel area is 1/16th the area of a pixel and is fixed in position within the pixel. Subpixels intersected by a face span are determined by identifying and logically ANDing those subpixels intersected by each edge of that face span. In order to resolve priority conflicts within a span, given the priority list, the face span occurances for a given span are processed in order, starting with the highest priority face and ending with the lowest priority face. As the subpixel areas for the highest priority face are found, they are accumulated in a span mask memory. This mask is used, as subsequent faces are processed, to prevent these faces from over riding any part of a higher priority face. The subpixel mask memory contains 16 bits, 1 bit per subpixel, for each pixel of the span. This mask is updated as each face is processed and is used to subtract out any portion of the face already covered within the span. Thus, while processing a span, a record of accumulated subpixels covered by the span features is maintained to determine the contribution of the newest feature.

The generation of the subpixel span mask is accurate in position and area to the subpixel resolution. The mask is accurate in position within the span to one subpixel or better and is accurate in area to one-half subpixel per-pixel or better. Span processing also includes mask modification to simulate translucency, the accumulation of successive faces in the span to determine the per-pixel area contribution of each face, and the detection of when the span is full.

In the color processor, the per-pixel area of a span face is received from mask processing. The contribution of this face to each dispay pixel of the span is determined by color processing. Color processing includes consideration of factors known to those skilled in the art, including: area weighting for field interlace display, color, haze, illumination, and modulation effects. The latter may be various forms of texturing and or curved surface shading. The color processor accumulates per-pixel color for successive faces of the span, as 12-bits each or red, green, and blue. When the span is full, the color processor outputs the span scene data to the display storage to be viewed by the pilot or trainee.

When comprehensive distortion correction is required in the area processing system as described above, so that straight lines appear straight in viewer space, segmented straight line approximation is used. The amount of distortion correction required determines the degree of segmentation. For a typical application, while mapping between viewer space and projector space is very nonlinear, segmentation at span boundaries results in a display which is visually indistinguishable from exact. This is the basis for the area processing comprehensive distortion correction technique. Projector space span corners are mapped into viewer space by the Geometry Processor. The Geometry Processor defines face edges in viewer space but also maps edge vertices into projector space. In the Display Processor, windowing is done in viewer space using the mapped span corners and edge coefficients defined by the Geometry Processor. Windowing identifies projector space spans intersected by the face edge. Points at which the face edge crosses span boundaries are determined, to maintain continuity between spans. These points are converted to projector span equivalent boundary crossings by ratioing associated boundary lengths. Projector space edge coefficents, which are only applicable to this edge in the one span, are then computed and used in the Mask Processor. In addition, range to the span corners in viewer space is determined using range coefficients defined by the Geometry Processor in viewer space. The corner ranges are used in projector space, being bilinearly interpolated to pixels for texturing, fading, and illumination processing. By this technique, efficient and high precision comprehensive distortion correction is achieved in the area processing system.

BRIEF DESCRIPTION OF DRAWINGS

FIG. 3 shows two faces intersecting a set of spans in a view window;

FIG. 4 is an expanded view of a span without comprehensive distortion correction;

FIG. 5A show a search direction table for determining the next span intersected by an edge;

FIG. 5B is a direction key for use with the lookup table data of FIG. 5A for establishing a search direction.

FIG. 7 shows a search direction chart for determining the next span that is intersected by an edge;

FIGS. 9A and 9C show an expanded view of a pixel and illustrate the generation of a subpixel mask;

FIGS. 10A, 10B, 10C, 10D and 10E illustrate another generation of a subpixel mask;

FIG. 11 shows the major tasks of the Display Processor;

FIG. 12 shows a detailed flow diagram of the window processing;

FIGS. 13A and 13B show a detailed flow diagram of the span data preprocessing;

FIGS. 14A, 14B and 14C show a detailed flow diagram of the mask processing;

FIG. 15 shows a detailed flow diagram of the color processing; and

DESCRIPTION OF AN ILLUSTRATIVE EMBODIMENT

A. General Description of the Computer Image Generation System

Figure 1:
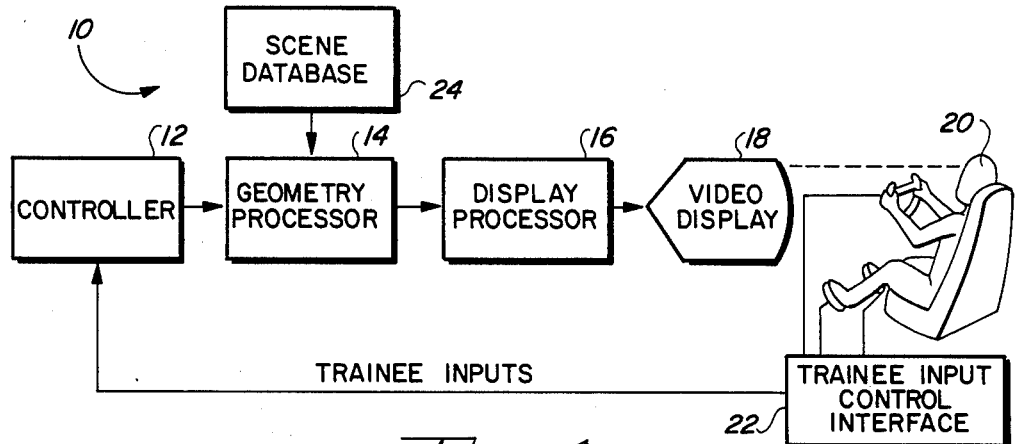
FIG. 1 illustrates a functional block diagram of a computer image generation system for a training simulator.

FIG. 1 illustrates a functional block diagram of a computer image generation system such as an aircraft cockpit simulation system. The system, generally designated by the reference numeral 10, includes a Controller unit 12, a Geometry Processor unit 14, and a Display Processor unit 16. The Display Processor unit 16 displays information to a cockpit display window 18 to simulate the movement of the aircraft over a scene. A pilot-trainee 20 is linked to the computer image generation system 10 through input control interface 22. The pilot's maneuvering action in the cockpit is fed to input control interface 22. The input control interface converts the appropriate flight data such as aircraft position, aircraft roll, pitch, and yaw attitude, from the pilot to the Controller 12.

In the Controller 12, the pilot inputs are used to calculate a new position and orientation of the aircraft, and from this, a mathematical rotation matrix is calculated that is used to rotate objects from the reference coordinate system to a display coordinate system, which is well known in the art. Other information dealing with the scene, the position of targets, or other aircraft is calculated in the Controller. In some computer image generation systems the Controller unit is a general purpose computer.

The Controller unit 12 is updated periodically by the most recent aircraft orientation. This orientation includes the aircraft roll, pitch, and yaw, and position from the pilot via the input control interface 22, to the Controller 12. The Controller 12 works on a scene for a field or frame time and then passes data to the Geometry Processor 14.

The Geometry Processor 14 reads from a scene database memory 24, descriptions of objects such as towers, roads, rivers, hangars, etc., that are potentially visible in the stored three dimensional digital representation of the earth. The objects are read from the scene database and are translated and rotated into display coordinates using the rotation matrix calculated in the Controller 12. The Geometry Processor 14 clips all edges which extend beyond the view window boundaries. It then mathematically projects the three-dimensional object data onto the two-dimensional display window. Object faces which extend beyond display window boundaries are then clipped in two-dimensional image space. The two dimensional objects consist of points, lines, closed convex polygons, or combinations thereof. Each closed convex polygon is known as a face. Thus, each object processed is made up of individual faces, where each face is bounded by straight edges. Once the faces are computed from the three dimensional objects, in the Geometry Processor 14, the data is passed to the Display Processor 16. In addition, the Geometry Processor 14 calculates which faces are in front or behind other faces and stores this information in a priority list. The priority list contains the order of all faces in the scene where the first face in the list is the highest priority face, and the last face in the list is the lowest priority face. Whenever two faces overlap on a display, the high priority face will be visible and the overlap portion of the low priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

In FIG. 1, there is shown Display Processor 16 that is used to drive the video display 18. In some systems, a single Controller 12 and Geometry Processor 14 is used to drive more than one Display Processor. The Display Processor 16 represents the majority of processing and hardware in a real time computer generation system and, for this reason, most of the effort to reduce the size of the hardware and processing time has been concentrated in the Display Processor area. The Display Processor is responsible for processing information to be displayed on video display 18. The Display Processor 16 has to resolve for each pixel in the video display 18 what the color of the pixel should be, given the many faces that can be present in a pixel, and those portions of faces that may be covered by other faces. After resolving the priority conflicts within a pixel, the area of each visible face within the pixel is multiplied by the color of the face, and the sum of all these weighted colors is output as a pixel color. Since there may be more than one million pixels in the display, and all of these need to be calculated in 1/60th of a second, the processing load in the Display Processor is very high. The Display Processor 16 receives two-dimensional face descriptions from the Geometry Processor 14, along with the face color, and a face priority list and uses this information to output the scene to color video display 18. Each color display in a system can be made up of 1,024 lines of video information and on each line there are 1,024 individual color dots or pixels. For each pixel the display receives 12 bits of red, 12 bits of green, and 12 bits of blue intensity information that describe the color of the pixel.

B. Video Display Representation of Faces, Spans, Pixels and Subpixels

1. Span Representation for a Frame

Figure 2:
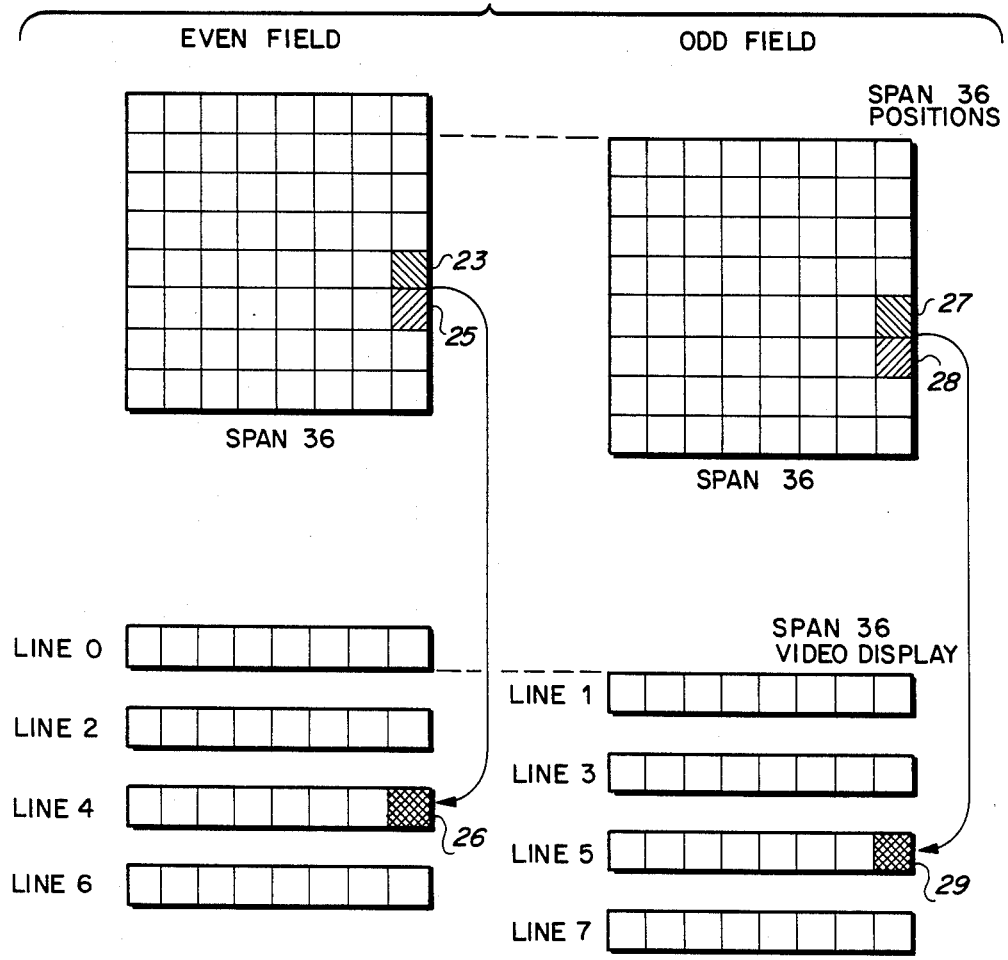
FIG. 2 illustrates an even field and odd field interlace for a video display.

The Display Processor 16 processing consists of the generation and the processing of spans. Spans are small rectangular areas of display fixed in size and shape which, for an application not requiring Comprehensive Distortion Correction, cover the view window. A complete description of span processing without comprehensive distortion correction is given in U.S. patent application Ser. No. 527,809, filed Aug. 30, 1983 and assigned to General Electric Company, the disclosure of which is hereby incorporated by reference. Ideally, the position of a span is fixed in position on a video display. However, the position of the span is changed vertically by one scan line by the even and odd field refresh of the video display. Referring to FIG. 2, there is shown the even field and odd field of a span 36. The odd and even fields are interlaced to form 30 complete frames, or images, per second in a manner well known in the art. The span 36 is shown displaced vertically one scan line of the odd field from the even field. Span pixel pairs 23 and 25 form display pixel 26 during the even refresh and span pixel pairs 27 and 28 form display pixel 29 during the odd refresh. During each field time all pixels in the span are processed to generate the display lines, the two fields being interlaced to form the video display image. Thus, a display pixel for one field is formed from two span pixels.

2. Span Representation Without Comprehensive Distortion Correction

During span detection the set of spans that contain portions of a face is found. Some spans at the boundary of the face will contain only a small portion of the face, and some spans will be completely covered by the face. FIG. 3 shows a face 30 and a face 32 and the set of spans that need to be identified in order to process the faces in detail without comprehensive distortion correction. The span 34 is outside the face 30 and face 32. The span 38 is wholly contained within the face 30 and not within face 32 and the span 36 is on the edge of the face 30 and face 32. The part of the face that lies within each span is processed in detail by the span processing of the Display Processor.

The two dimensional face 30 is bounded by 5 edges; A-B, B-C, C-E, E-F, and F-A. Face 32 is bounded by line segments A'-B', B'-C', C'-E', E'-A'. Each edge is defined by both the endpoints of the line segment and by a line equation of the form:

$$D = LO + LI*I + LJ*J \quad \text{(Eq. 1)}$$

Where D is the perpendicular distance from a point (I,J) to an edge, LO is an initial distance determined in the Geometry Processor from a fixed reference point such as I=0 and J=0, LI is the cosine of the edge slope and LJ is the sine of the edge slope.

Referring to FIG. 4, there is shown an expanded view of span 36. Span 36 is composed of an 8×8 matrix of pixels. Pixel 40 is shown in relative location to the rest of the pixels.

Edge A-B of face 30 and edge C'-E' of face 32 are shown. Edge A'B and C'-E' both pass through pixel 40. Pixel 40 is almost completely covered by a combination of face 32 and face 30 respectively bounded by edges C'-E' and A-B. D1, D2, D3 and D4 are the perpendicular distances from the corners of the span to edge C'-E'. The distances D1, D2, D3 and D4 are computed using equation (1). As will be explained later, each face is scanned along the boundary of the face, one edge at a time, in a clockwise direction and always in a clockwise direction. Using equation (1), and since the edge is scanned from C' to E', the distances D1, D2, D3 and D4 are easily computed. In our example, D1 is positive, D2 is negative, D3 is negative and D4 is positive. The next span that the edge C'-E' intersects can be easily determined by knowing the signs of these distances. For FIG. 4, the next span which C'-E' will intersect is the span directly below or south of span 36.

Using this information a table can conveniently be used to determine the next span an edge will probably intersect. FIG. 5A shows a search direction table without comprehensive distortion correction which is used to compute the next span an edge will intersect. The sign and magnitude of each distance D1 through D4 will uniquely determine the next span to search. Using a lookup table for a search direction decreases computation time, since no computations must be done. For example, referring back to FIG. 4, since D1 is positive, D2 is negative, D3 is negative and D4 is positive, the search direction table uniquely determines the next span that is intersected by edge C'-E' is the span below span 36. An entry of zero in the search direction table signifies that the edge intersects the vertices. FIG. 5B is a direction key for use with the lookup table data of FIG. 5A for establishing a search direction.

The use of a lookup table to compute the intersection of the edge with the next span can be implemented in a table lookup read only memory (ROM), where the slope of the edge and end points are inputs into the address lines and the output from the memory lines are the perpendicular distances. Thus, the computational processing required to compute the spans intersected by an edge can be quickly and efficiently done using hardware. This decreases the computational time of the Display Processor and allows faster processing of the data.

3. Span Representation with Comprehensive Distortion Correction

Figure 6A:
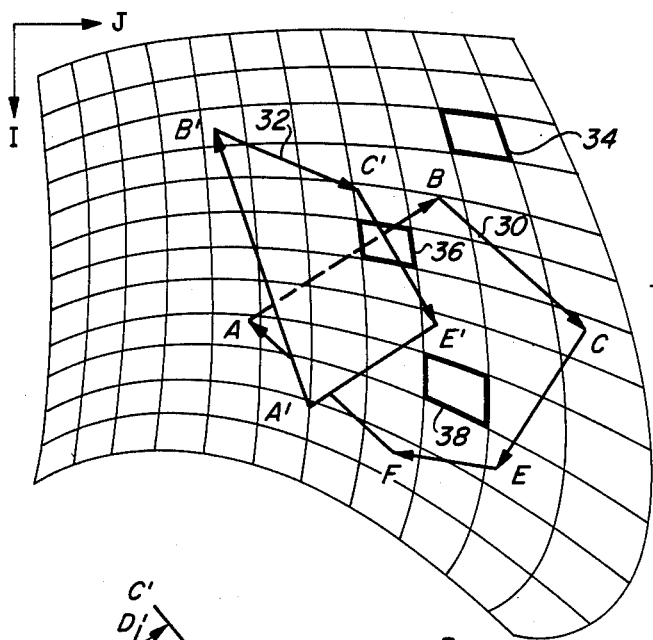
FIGS. 6A and 6B show two faces intersecting a set of spans in viewer space without distortion correction.

With a display which requires Comprehensive Distortion Correction, the system must differentiate between the projector coordinates, in which the image is generated, and the viewer coordinates, in which the image is displayed. In the image generator the spans are rectilinear as described above. On the display surface the grid of spans is curvilinear as shown in FIG. 6A. Since a face edge must appear straight when viewed by the trainee, it is described in viewer coordinates by the Geometry Processor. Referring to FIG. 6A, there is shown the same face 30 and face 32 in viewer space. The face 30 is bounded by 5 edges; A–B, B–C, C–E, E–F, and F–A. Face 32 is bounded by line segments A'–B', B'–C', C'–E', and E'–A'. In viewer coordinates each edge is defined by both the endpoints of the line segment and by a line equation as given by equation (1).

Figure 6B:
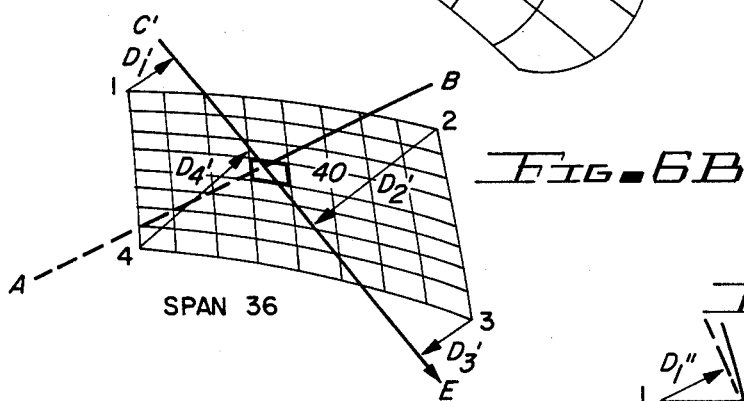

Referring to FIG. 6B, there is shown an expanded view of span 36 in viewer space. Edge A–B of face 30 and edge C'–E' of face 32 are shown. D1', D2', D3' and D4' are the perpendicular distances from the corners of the span to edge C'–E'. The distances D1', D2', D3', and D4' are computed using equation (1). The I and J coordinates of each span corner are computed by the Geometry Processor for the field which is being processed. Each face is scanned along the boundary of the face, one edge at a time, in a clockwise direction and always in a clockwise direction, so that the face is always to the right of an edge. Distance is negative if determined from a point to the left of an edge and is positive if determined from a point to the right of an edge. In our example, D1' is positive, D2' is negative, D3' is negative, and D4' is positive. The most likely next span that the edge C'–E' intersects can be easily determined by knowing the signs of these distances.

Referring to FIG. 7, there is shown the search directions possible for an edge through a span with comprehensive distortion correction. Since D1' is positive, D2' is negative, D3' is negative, and D4' is positive, it is quickly determined that element 39 gives the direction to search. For FIG. 7, the next span which C'–E' will intersect is the span directly below or south of span 36. However, if the edge intersects a corner of the span, so that distance from that corner is zero, there is uncertainty in identifying the next span due to comprehensive distortion. In some cases the next span is identified incorrectly and other possible next spans must be examined.

Using this information a table can conveniently be used to determine the next span an edge will probably intersect and, if not, to direct the search back onto the edge in the following span. FIG. 7 shows a search direction table which is used to compute the probable next span an edge will intersect. The sign and magnitude of each distance D1 through D4 will uniquely determine the next span to search. Using a lookup table as described before, the next span to search can be easily and quickly determined.

Figure 8A:
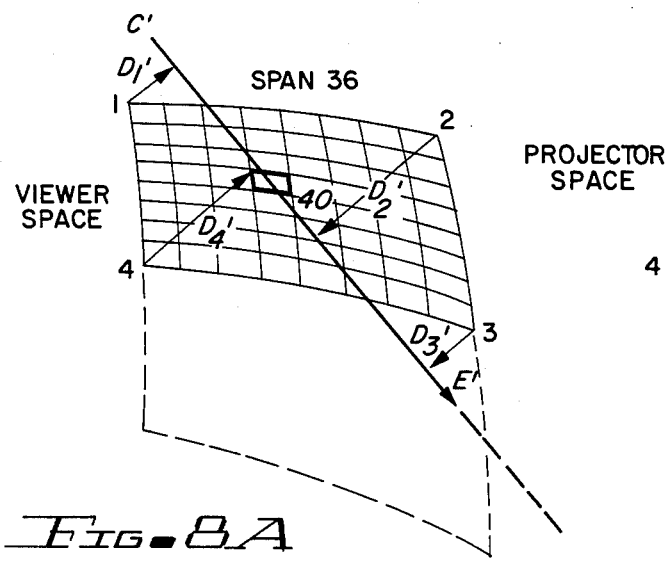
FIGS. 8A and 8B illustrate an expanded view of a span in viewer space.
Figure 8B:
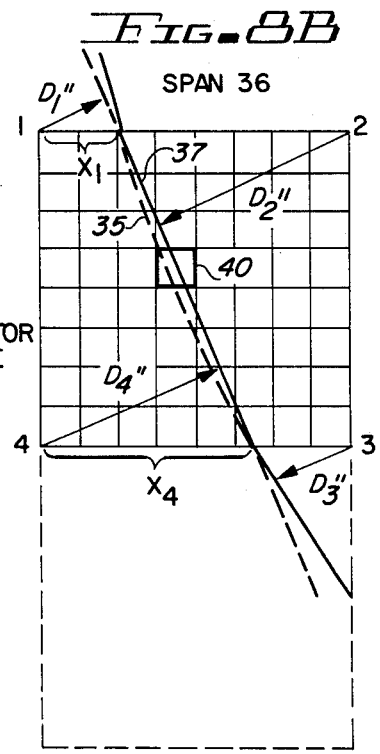

The spans identified in viewer space must be processed in projector space. As can be seen by comparison of FIGS. 8A and 8B, due to the distortion of the span, edge information developed in viewer space cannot be used in projector space but must be recomputed for each edge in each span. In addition, while the slope of an edge may change at the intersection of two spans in projector space, the edge segments between two spans must be continuous across the boundary as shown in FIG. 8B. FIG. 8B shows the edge C'–E' 37 in projector space compared with edge C'–E' 35 as determined in viewer space. Edge C'–E' 35 is curved because of the curvilinear grid of viewer space, as compared to the straight edge C'–E' 37 projector space. To meet the continuity requirement, the points at which the edge intersect the projector space span boundary are computed by ratioing, of the form:

$$X = N*Dn/(Dn + Dm) \quad \text{(Eq. 2)}$$

Where X is the distance from projector span corner to the edge intersection, N is the dimension of the projector span (for example N=8), Dn is the viewer space perpendicular distance to the edge from corner n and Dm is the viewer space perpendicular distance to that edge from corner m, corners n and m being selected for the intersected span boundary. Since this calculation is repeated for the same intersected span boundary when the next span is processed, edge continuity is guaranteed. The calculation of equation (2) is repeated for the second span boundary crossing.

From the two crossings the slope of the edge can be found. This defines LI' and LJ'. Using these in equation (1), with any IJ lying on the edge (either boundary crossing will suffice) and with D set to zero, LO' can be calculated. These edge coefficients are then used to calculate the distance from projector space span corners, D1" through D4", as shown in FIG. 8B.

4. Subpixel Representative for a Pixel

FIG. 9A–B shows the pixel 40 comprised of 16 subpixel areas. A subpixel is 1/16th the area of a pixel, i.e., 16 subpixel areas equal one pixel. It is important to note that the subpixels are actually areas and not points. Data from equation (1), distance and slope, can be used to determine the subpixels that are covered by a face. Thus in FIG. 9A, D0', which is the perpendicular distance from the center of the pixel to edge C'–E', is determined. The angle of the line is available from the coefficients LI' and LJ'. By table lookup, distance and angle values determine those subpixels which lie on each side of the edge to a total area accuracy of one-half subpixel or better and a position accuracy of one subpixel or better. Since the edge was scanned in a clockwise direction, D0' is positive and the indicated subpixels to the left of edge C'–E' are included in the face. For example, subpixel 41 is covered by face 32. In FIG. 9B, however, for edge A–B, D0 is positive but subpixel 41 is not in face 30. Similarly, subpixel 42 does not lie in either face. Some subpixels, such as subpixel 43, lie in both faces. Such subpixels are assigned to the highest priority face, in this case face 32.

FIG. 9A shows the subpixel weight for face 32 in pixel 40 in form of a subpixel mask. FIG. 9B shows the subpixel weight for face 30 in pixel 40 in form of a subpixel mask. Since face 32 has priority over face 30 and is processed first, there will be 10/16ths unit of face 32 color and 5/16ths unit of face 30 color, or 15/16ths unit total as shown in FIG. 9C. To be complete a pixel must have a full unit of color. A third, lower priority face not identified in this example, will provide the missing color fraction. When all pixels of the span are completely filled, the processing is terminated since no other lower priority face can contribute to any pixel color. Thus, the span color can be quickly determined and can be implemented in hardware using a ROM lookup table as described before to decrease the computational time while giving face edges an accurate and realistic look.

This example would seem to indicate that a subpixel is inside the face if its center is inside the face, as shown in FIGS. 9A and 9B. This however is not strictly true. Subpixels are assigned such that they best approximate the total area and position within the pixel. For instance, referring to FIG. 10A, if a horizontal edge is very close to the bottom of pixel 40 as shown in FIG. 10A, the weight of the subpixels in that row will be 0. However, if the edge is slowly moved upward, a point will be reached at which the area of the pixel covered by the edge face will be greater than onehalf subpixel as shown in FIG. 10B. In this case the weight of one subpixel is modified to 1 even though the edge has not reached the center of any subpixel. In FIG. 10C the edge has moved further upward so that the pixel area exceeds one and one-half subpixels and the weight of a second subpixel is modified to one. In a similar manner, for any edge with any slope intersecting the pixel, subpixels are weighted to best approximate position and slope within the pixel. For instance, as shown in FIGS. 10D-E, if two faces do not overlap but share a common edge, the subpixels which are selected for the two faces wil neither overlap nor leave empty spaces. This process results in a more realistic and accurate video display and can be easily implemented in digital logic or in a lookup table ROM.

C. Block Diagram For Display Processor

FIG. 11 shows the high level flow diagram of the method in which the data from the Geometry Processor is processed through the Display Processor and output to a video display. Initially, in step 42, the data from the Geometry Processor is passed to the window processor 44. The window processor 44 identifies those spans which are intersected by each edge of each face. The search is carried out in viewer space using edge data and span corner coordinate received from the Geometry Processor. The window processor 44 receives and stores edge, point feature, span vertex and face priority data during the Geometry Processor time period. It windows face edges using edge scan to identify all intersected spans therein. Span edge intersections which will contribute zero area to the span face are flagged for later elimination to reduce the mask processor loading and to prevent false faces. False faces are narrow faces which, due to inaccuracies, are not traced in a clockwise edge sequence.

The window data are stored in linked lists by channel spans. Spans are processed in row sequence, left to right within a row. All data within a span are ordered by face priority via a pipeline ordering stack. The window processor fills in covering faces, between face edges, and suppresses certain data: lower priority data and spans fully covered by a higher priority opaque face; false faces characterized by edges which do not circumscribe a face in required clockwise sequence; flagged faces which are outside a programmed area of interest; data and spans which are external to the viewer space. The window processor then passes the data on to block 46, the span data preprocessor. The span data preprocessor receives data for a span from the window processor, and stores it in an active face list. The span data preprocessor controls access to N-interleaved spans, permitting the highest priority face that is in a span to be given to the mask processor block 48, before proceeding to the next span. That face is processed and then processing proceeds to the next span. A second face will not be processed for the N1 span until all [N−1] other spans with their highest priority face have been processed and a span full status flag 47 has been received back from the mask processor. Note that the highest priority face of another span. Upon receipt of a span full flag 47, whose status indicates that the span is not full, the span data preprocessor outputs the next face of the give span. Upon receipt of a full span status flag the span data preprocessor assigns a new span to that interleaved time slot and outputs the first face of the new span. Normally there are N=128 interleaved spans. Near the end of the field, when there can be fewer than 128 spans incomplete, N can decrease progressively to 0. When N is less than 128, the span data preprocessor will output additional faces of the same span without awaiting the full-not full flag feedback. Overall operation will insure that the mask processor functions at maximum efficiency and does not process span faces which do not contribute to the displayed image.

The Mask Processor 48 calculates projector space edge coefficients for a span edge based on viewer space distances from the span corners, received from the window processor. Distance is interpolated to the center of all pixels. This distance is used to generate and accumulate edge areas of a span face, one edge at a time. Area is resolved to one subpixel. Translucency, programmed from the Geometry Processor and computed here, is introduced at the mask processor. The mask processor processes all control faces such as lights and flares and stores necessary data for use with subsequent faces of a span. The mask processor includes a subpixel mask memory for the interleaved spans. It provides pixel-pair face areas to the color processor and identifies when processing of a span is complete ("span-full flag 47") to the color processor and span data preprocessor. A pixel-pair is defined as an area of 4×8 subpixels which comprise the display element, as was shown in FIG. 2.

Referring back to FIG. 11, the Color Processor step 50 receives face colors from the Geometry Processor, haze colors from the Controller, and pixel area from the mask processor. It uses these data to compute color contribution of the new span face. Interleaved span data are accumulated and stored in a video buffer memory. Upon receipt of a span full flag span color data for that span are output to the video memory block 52.

1. Window Processor

Throughout the geometry processing time the window processor receives face edge data from which it generates a list of all spans intersected by each edge.

Referring to FIG. 12 there is shown the process of determining and ordering the edge intersections by span, which is accomplished by the window processor. Initially at step 54, the window processor gets the first edge of the first face from the Geometry Processor. The window processor then starts a search at the first vertex that is included within a span. This is shown as step 56.

Referring briefly back to FIG. 3, for edge B'-C' this would be vertex B' of face 32. The window processor determines which faces and which edges occur in a span. The window processor orders the edge intersection by span as shown in step 58. In step 60, the window processor determines if the end verex is in the span. If not, the procedure continues to step 62. At step 62, the distances from the span corners to the edge are calculated in viewer space, as has been described before, according to equation (1). In step 64, after calculating the distances, the next span to search is given by the unique distances at each span corner via a table lookup as has been described before. Thus, the window processor, after calculating the distances from the span corners to the edge, knows the next direction to search to identify the next span that the edge intersects. This is shown as step 66. Upon determining the next span that the edge intersects, the procedure returns to step 58 in which the edge of a face is ordered by span. The window processor then determines if the end vertex is in the span. Eventually the end vertex will be present in a span and the result of step 60 will be positive and proceeds to step 62. In step 62, the window processor determines if this is the last edge of the face. If not, then the window processor gets the next edge of this face in step 64 and the procedure begins again at step 56. Thus, the window processor determines the spans that an edge intersects and orders those intersection by span. For example, referring briefly to FIG. 3 again, the window processor has started at B' and determined the spans in which B'-C' intersect. Upon reaching C' which is the end vertex of B'-C', the window processor then determines the spans in which the edge C'-E' intersect. Continuing in this mode, the window processor proceeds in a clockwise direction as is shown by the arrows in FIG. 3 from E' to A' and then from A' back to B'. In this manner, the window processor determines the spans for the intersection of the edges of a face.

Referring to FIG. 12, the window processor then proceeds to the next face which is shown in step 66. If the last face has been processed, the window processor procedure is finished. If the last face has not been processed, the window processor gives the first edge of the next face in step 68 and repeats the procedure of searching and ordering the edges by starting again at step 56. When the window processor has finished detecting the spans, each span will have a list of the edges that intersect that span. The data from the window processor is then passed to the span data preprocessor.

2. Span Data Preprocessor

FIG. 13A shows a detailed sequence of operations for preprocessing the span data from the window processor. In step 70, the span preprocessor receives an edge intersection from the window processor and acquires a span pointer or address from the index memory. The index memory in a list by span of the address in list memory where the last edge intersecting that span is stored. Each edge in list memory is accomplished by the list memory address where the previous edge intersecting that span is stored, etc., so that all edges which intersect a span are linked together. In step 72, the index memory is updated to the address in list memory where the edge intersection is to be stored. Storage of edge and link pointer to list memory occurs in step 74. This sequence is repeated for each edge intersection as it is received from the window processor.

After all edges have been windowed and stored in list memory, the span data preprocessor then starts the display processing in step 76. Data is processed in span row sequence, one span at a time, proceeding from left to right along the span row. Edges of the first span are read in step 78. This is shown in more detail in FIG. 10B and includes a first sub-step 77 of getting a pointer from the index memory. In sub-step 79, the edge and next pointer is read from a list memory. The edge data is then provided for priority ordering as shown in sub-step 81, and if this data does not represent the last edge in the span, as shown by decision sub-step 83, the process returns to read reading the next edge until all edges are done. In this manner, the span preprocessor reads in all the edges for the first span. Block 80 represents the face priority list from the Geometry Processor. As an edge is read from list memory, its face number is used to access face priority from block 80. In step 82, the span data preprocessor orders the edges in the span by decreasing priority.

Since all edges of a face will have the same priority number this also accomplishes face ordering, outputting all edges of a face in sequence. After face-priority ordering, the span data preprocessor identifies those faces which potentially cover the next span in the row, step 84. In step 86, edges in the current span are merged, in priority sequence, with covering faces saved from the previous span. Of course, if the current span is the first span in the row, there is no input from step 84. Also, if there is an edge of that same face coming from step 82, the potentially covering face does not cover the span and is discarded. The span preprocessor then stores the results in a span sequencer as shown in step 88. If this is the last span, step 90, the span data preprocessor is finished. If not, the span preprocessor reads in the edges for the next span and processing begins again at step 82 to order the span edges by face priority. In step 88, the ordered span edges are stored in the span sequencer. Block 90 represents receipt of a span identification from mask processing. This is a request from the span sequencer to output the next face in the identified span. The edges of this face are read from span sequencer memory in step 92 and are output to mask processing in step 94.

The span sequencing portion of the span data preprocessor and mask processing work in a feedback pipeline technique. Up to 128 spans are processed at any instant in time, one face of each span being present in the pipeline. The mask processor calculates projector space edge coefficients and processes the edges of a face to generate a face mask and to determine the contribution of said face to each pixel of the span. The mask processor also determines when a span is full. If the span is not full the mask processor requests the next face of that span via block 90. If the span is full, the mask processor requests the first face of a new span. Determining a span is full signifies that the colors for each pixel in each span have been determined and that no further processing is necessary on this span. Thus, as can be seen, the processing of the video data is speeded up by stopping the process of determining the colors for each pixel of each span by terminating the span preprocessing when the span is full. Thus, the span preprocessor and mask processor process only those faces necessary to develop a realistic image.

3. Mask Processor

Referring to FIG. 14A, there is shown in detail the processing for the mask processor. At the start of processing, in step 96, the mask processor identifies the first 128 spans to be processed. As processing by individual spans is completed, other spans in the scene are substituted until all spans have been processed. The selected spans are identified one at a time to the span data preprocessor which returns the edges of the first face in that span. The first edge of that first face is received in step 97. In step 98 the projector space edge coefficients LI' and LJ' are computed for this span edge based on viewer space perpendicular distances, as has been described previously. The procedure then continues to step 100, which determines the perpendicular distance from the span corners to the edge, as described by equation (1) and shown in FIG. 14B. The offset distance to the center of the corner pixels is then determined in step 102, as shown in FIG. 14C. Referring briefly back to FIGS. 9A-C, in our example of determining the color for pixel 40, the offset distance from the center to edge A-B and edge C'-E' has been determined. It has been found that processing time can be further decreased, by interpolating the distance to the center of each pixel, instead of computing the distance to the center of each pixel. Thus, by knowing the distance from the center of each corner pixel to the edge the distance to the center of any other pixel can be determined by linear interpolation in a manner well known to those skilled in the art.

Referring to FIG. 14A, this is shown in step 104. In step 106, the span edge mask is generated as was described previously. In step 108, the span edge mask is ANDed with others of the span face to determine subpixel weight for the pixel face. In step 110, it is determined if the last edge of the span face has been processed. If not, the next edge of this face in this span is retrieved as shown in step 112 and processing begins again at step 100 to determine the subpixel weight for the pixels of this span. If the last edge of the span face has been processed as referred to in step 110, the face mask is output as shown in step 114. For an edge defined face feature, the steps 100-112 process one edge at a time to generate and accumulate a subpixel span face mask. In step 116, the subpixel span face mask is next ANDed with a subpixel translucency mask for blending applications. Translucency is controlled from the Geometry Processor and/or from external logic. When controlled from the Geometry Processor, translucency is the same for each pixel of the face. When controlled from external logic, translucency may be different for each pixel. This is fully described in U.S. patent application Ser. No. 527,809 filed Aug. 30, 1983, assigned to General Electric Company which is hereby incorporated by reference.

Proceeding to step 118, the old accumulated span mask is subtracted from the new face mask to determine the new face contribution to the image. The contribution of this area, expressed in per-pixel areas, is determined in step 120. This new face contribution is passed to the color processor in step 122. The new face mask is also added to the old accumulated span mask in step 124 to generate a new accumulated span mask. The new accumulated span mask is checked in step 126 to see if it is full. If the span is full, a full flag is sent to the color processor by block 128, in association with the new face area data from step 122. If the span is not full, processing of the span continues. The span is returned to interleaving and the first edge of the next face in this span is accessed in step 130; processing resumes at step 100. If the span is full, it is determined in step 132 whether or not there are any spans left which have not been started. If a span remains, one of these spans is assigned to interleaving in step 134. The first edge of the first face of the new span is acquired in step 136 and processing resumes at step 100. If there are no spans which have not been started, but there are spans in interleaving which have not been completed, one of these spans will be assigned an additional slot in interleaving, to process the next face in that span, etc. When all spans have been completed and none remain in interleaving, mask processing of the field is complete.

The finding of the pixel area is very efficient and lends itself to being implemented in hardware via a ROM (Read Only Memory) lookup table. A pixel to edge distance, and an edge slope are inputs for the address lines of a ROM, and the output of the ROM is the set of subpixel bits that best approximate the area and position of the intersecting edge face. If there are more than one edge of the same face intersecting the span, the process is repeated for each and the several subpixel masks are logically ANDed to approximate the face. If the face is defined as being translucent, the span face subpixels are logically ANDed with a pseudo-random mask whose area, defined to subpixel resolution, corresponds to the face opacity. Thus, the finding of the pixel area for a face can be implemented in hardware in a very fast efficient method.

In addition to the ROM processing for determining the distance D values, the total hardware involved in determining net pixel area for new faces, computing the area-times-color, and modifying the mask memory can be implemented by Very Large Scale Integration VLSI circuitry. The hardware involved can be a series of registers, incrementers, value-to-logic converters, and ANDing hardware that can be designed in VLSI circuity in a manner well known to those of ordinary skill in the art. The implementation of the mark processor in VLSI circuitry further decreases the computational time and the hardware circuitry in processing the span data.

To summarize, the mask processor processes all of the faces that lie within a span, in order, starting with the higheset priority face and ending with the lowest priority face. As each face is processed, the area of the span covered by the face is saved. As additional faces are processed the total area covered is accumulated in a mask memory. The mask memory is used as faces are processed to prevent low priority faces from being visible where high priority faces have already been painted. In addition, the mask memory is used to determine if the entire span has been covered by faces. Face processing for a span terminates when the span is detected to be completely covered. All remaining faces for the span are discarded, since they can not possibly contribute anything to the span. Each face that is found to contribute to the span is sent on, along with its area mask to the span processor.

The span processing steps are implemented using a pipeline. The face is fed into the pipeline one edge each clock time, so that the face rate varies with the number of edges. After an N clock time pipeline delay, the face comes out of the end at a rate of one face every two clock times. N consists of two delays, N1 and N2, in series. N1 acts as a FIFO and provides the function of rate buffering, between the variable input rate and the fixed output rate. N2 is a fixed delay corresponding to the delay through the texturing function, described in U.S. patent application Ser. No. 527,809 which has been incorporated by reference, which provides synchronism between the mask processor and texture generator. Total delay, N clock times, is chosen sufficiently high to maintain continuous outputs, one face each two clock times, with a high level of confidence. Normally this is sufficient to hold faces for 128 interleaved spans. When necessary, the input is held up so as not to exceed this. Very occasionally, if there are a large number of faces each with a large number of edges being input, it may be necessary to hold up the output. However, this combined delay is a key feature of this processing and guarantees that time is efficiently used. Another key aspect of this delay is that, as soon as a span is detected to be completely covered, all subsequent faces are discarded immediately, further guaranteeing efficient operation.

It is impossible to know the translucency of a cell texture face, such as smoke, when the face is put into the pipeline. All of the texture calculations occur inside the pipeline delay. As soon as the cell textured face gets through the pipeline the per-pixel translucency information is available and can be used to determine if the span has been covered and, if so, to terminate any successive faces for the span. Without span interleaving, all faces that are lower priority than the cell textured face would have to be put into the pipeline immediately after the cell textured face is put in. If the cell textured face turned out to be opaque, then the succeeding faces would not be used and efficiency would be lost while the pipeline was being cleared.

To eliminate this problem, interleaving of spans is done. A list of faces for a span is generated, and stored in memory. Subsequent span face lists are stored as they are generated in the same memory. All of the faces for a span are linked together with pointers, and a separate set of pointers serve to identify the first face of each span. The span data preprocessor which feeds the mask processor, uses these pointers to feed the highest priority faces to the mask processor, one face at a time. These pointers are updated as they are used, to point to the second face for the span. The control mechanism implements a round-robin sampling of faces in a set of N spans. The number N is determined by the length of the mask processor pipeline, which depends on the particular implementation. Mask memory for all N spans is maintained, so as a face is pulled from the list, the covered test can be performed to determine if the face is to be discarded or put in the pipeline. If the span is determined to be covered, or if the last face for a span is pulled from memory and processed, then a new span list is substituted for the completed span during the round-robin sampling. This approach gives 100 percent efficiency if the span face lists are stored in memory at a higher rate than span completion.

When one of the N spans in the round-robin processing is full, then its associated array of perpixel area is output to the color processor. The mask memory for the span is cleared, and then re-used for the next assigned span.

4. Color Processor

FIG. 15 shows the flow diagram for the color processor in detail. In step 142, the data from the mask processor is received which is the per pixel areas of the new span face. The color processor receives the per pixel modulation and range data from the mask processor, face colors from the Geometry Processor, haze colors from the Controller. It uses these data to compute per pixel color (red, green, blue) contribution of the new span feature. Successive span color data are accumulated and stored in a video buffer memory. Upon receipt of a span full flag, the span color data are output to the video memory. In step 144 data including face color, haze color, and illumination are selected for the current face from data previously processed or received from the Controller and Geometry Processor. Per-pixel modulation and range data are received from external logic described in U.S. patent application Ser. No. 527,809 in step 148. Modulation is typically used to simulate texturing and/or curved surface shading but is not limited to this. Said modulation generation must provide comprehensive distortion correction by using range to the span corners computed in viewer space coordinates and determining per-pixel values from these, using bilinear interpolation. Range, bilinearly interpolated here also, is used in step 148 to determine per-pixel fading due to simulated haze or fog.

The color processor then computes the per pixel color contributions of the new span face as shown in step 150. This new color contribution, plus the old accumulated per-pixel span color, as shown in step 152, is summed as shown in step 154. The sum of the per pixel old span color and the new span face color are then output to the video memory, as shown in step 156, if the span is full as determined by previous step 158. If the span is not full, the new accumulation of the per pixel span color is stored in step 160, for later combination with the next face of this same span. The red, green and blue span intensity components calculated for the current face span are accumulated with the intensity components for the previous span faces as shown in steps 150, 152 and 154. Upon receipt of a full status from the mask processor as shown by line 162, the color processor outputs the new pixel colors to the video memory as shown in 158, thus, the span is updated on the video display to be seen by the user.

5. Comprehensive Distortion Correction

Many display systems, particularly those employing spherical or cylindrical screens, require that a predistorted image be computed and placed on a projector raster, in order that the image seen by the viewer appear correct. In comprehensive distortion correction, the projector raster is divided into spans, typically eight pixels or eight scan lines Although the mapping between viewer space and projector space is highly non-linear, it can be considered linear for a small area such as a span. For most display systems a 32 by 32 region of linearity is satisfactory. In a high resolution (1024 by 1024 display), a diagonal straight line in viewer space may be generated as a curved line in projector space by up to 256 linear segments, depending on its length.

Implementation of comprehensive distortion correction is divided between the Geometry Processor and the Display Processor. The Geometry Processor transforms the corner coordinates of spans from projector space to viewer space for each view and provides this data to the Display Processor. For fixed geometry applications (i.e. fixed projector and eyepoint) this may be precomputed and stored in a programmable read only memory. For variable geometry applications (i.e. trainable projector and/or movable eyepoint) the Display Processor must transform these points (over 4,000 points in a typical display) each field time.

The Display Processor must also transform all image vertices from viewer space to projector space at the image update rate and identify the probable projector space span in which each vertex lies. Because the side of a transformed span is actually curved in projector space, but is approximated by a straight line, depending on its location, there is sometimes uncertainty as to which span the vertex is actually in. In such cases, the Geometry Processor identifies these additional possible spans by "close" flags which accompany the probable span idetification to the Display Processor.

The window processor of the Display Processor identifies all spans possibly intersected by a face edge. This is somewhat inefficient at this point in the system identifying some spans which are not actually intersected. However, as discussed before such zero-area span faces are detected and deleted. The window processor processes the spans in viewer space, using viewer space edge coefficients generated in the Geometry Processor. Intersected spans are identified in projector space by using the transformed span corners and vertex locations from the Geometry Processor. The viewer space distance to a face edge from each span corner is determined. Span corner distance data is used to compute the intersection of the edge with projector space span boundaries (equation 2). The intersections are then used to compute edge coefficients applicable to each span. The technique ensures continuity of face edges across span boundaries. The new edge coefficients are input to the mask processor function, the same as has been described before. Spans identified by the Geometry Processor as possibly intersected by an image face but which are not actually intersected are recognized and discarded in the mask processor.

Transformed span corner coordinates are also used in the cell texture generator function of the Display Processor. Processing is normal except that bilinear interpolation between the corners, rather than linear interpolation is required for perpixel data (e.g. for fogging and texture modulation).

Figure 16:
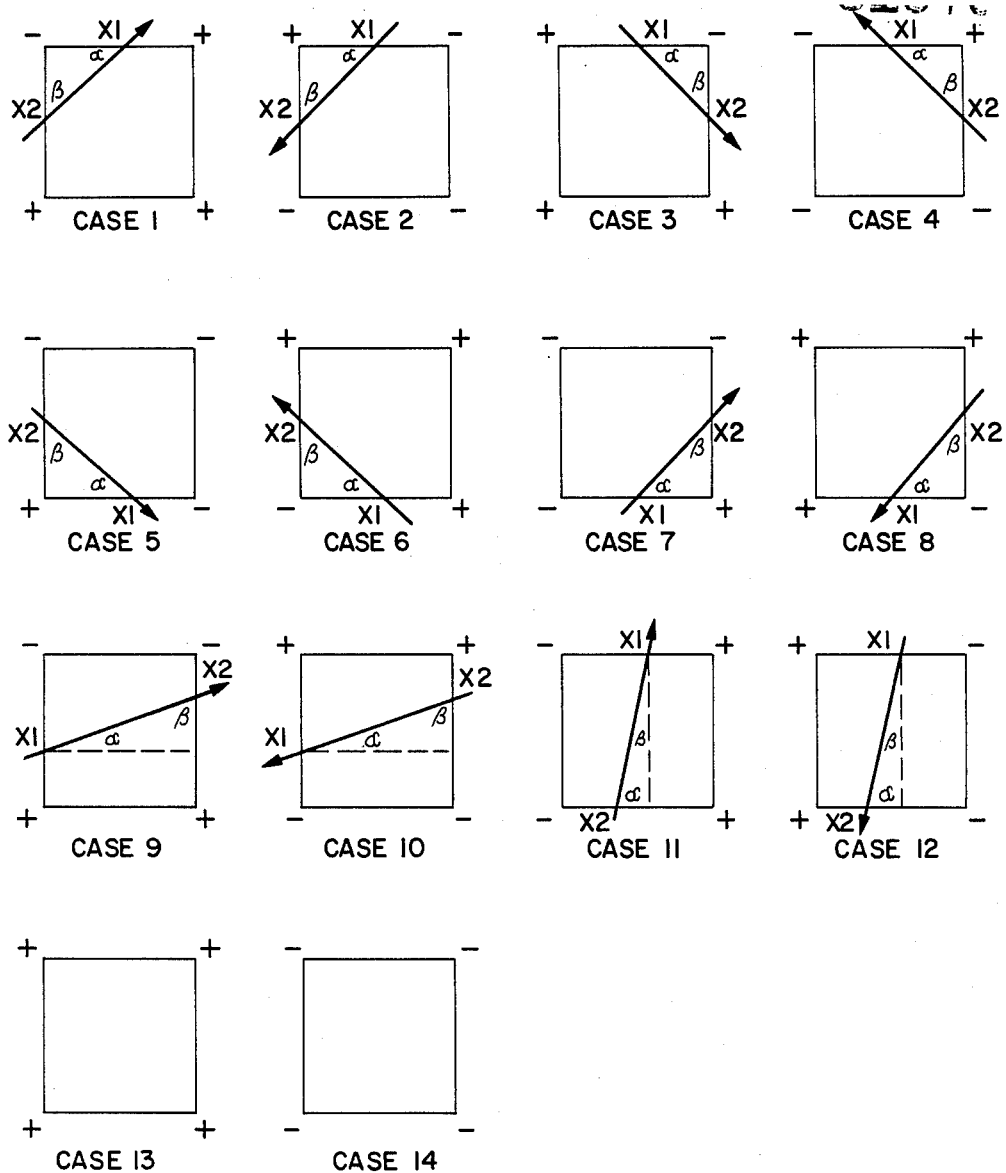
FIG. 16 shows the fourteen possible edge intersection cases.

Referring to FIG. 16 there is shown edge crossing cases for edge coefficient calculations. Directed distances from span corners to a face edge computed as has been described before in the window processor, are processed to determine edge coefficients for a projector space span. Directed distances are bilinearly interpolated to the span. The fourteen possible edge intersection cases as shown in FIG. 16, are considered based on the signs of the distances. For example as shown in FIG. 16 the span 170 has a negative distance in the upper left hand corner from the corner to the edge, this is signified by the negative sign at the upper left hand corner. The distance from the edge to the upper right hand corner or the span is positive, signified by a positive sign at the upper right hand corner of span 170. Continuing, the distance to the lower right hand corner is positive of span 170, and the distance to the lower left hand corner is also positive. The rest of the cases are the possible edge intersections that can occur through a span. Next the intersect distances X1 and X2 are calculated from using elementary geometry. The projector space edge coefficients are then calculated from X1 and X2 using elementary geometry and trigonometry.

Briefly then each edge has a different projector space definition for each span which it intersects. Four viewer space D values are determined by applying the viewer space edge equation to the span corners mapped into viewer space as has been described before. These D values are used with a projector space span definition to determine where the edge intersects its span boundaries. Projector space edge coefficients are calculated, representative of the edge for the span. This is repeated for all the edge span intersections.

For each pixel intersected by a face, there are also values which modulate the face color or intensity. These include fog simulation, curvature simulation, and cell texture. The values required to implement the modulations are expressed as functions of I and J and viewer space. These modulation functions are evaluated at the viewer space span corners. They are needed at each pixel in projector space and suitable precise values are obtained by applying bilinear interpolation to the corner values.

The edge definitions and modulation values determined by the comprehensive distortion correction processing described above are sent to the mask processor and color processor, where these functions are performed as if there were no comprehensive distortion correction as has been described before.

Thus, although the best modes contemplated for carrying out the present invention have been herein shown and described, it will be apparent that modification and variation may be made without departing from what is regarded as the subject matter of the invention.

What is claimed is:

1. In an image generating system of the type for converting digital data into a sequence of display frames of image data in projector space suitable for display on a video image system in viewer space, the image system forming a display by individually illuminating each of a plurality of color pixels, each of the frames of image data defining a plurality of faces and each of the frames being divided into a plurality of spans, including an electronic control means for converting the digital data, a method for correcting for geometric distortion and optical distortion comprising the steps of:
    (a) identifying data for a frame of display, the data defining face locations in viewer space, each of the faces associated with at least one span and being arranged in a descending order of priority;
    (b) calculating transformation coefficients for mapping projector space span corners into viewer space;
    (c) determining the highest priority face for each span;
    (d) determining an area within a viewer space span covered by the highest priority face;
    (e) computing pixel image data representative of the pixels within the projector space span covered by the face;
    (f) repeating step (c) through step (f) until the last face is processed into pixel image data or until all areas of the spans are fully covered by faces; and
    (g) transferring the pixel image data to the video image system.

2. The method of claim 1, wherein the step (b) of calculating, further comprises the step of predetermining the transformation coefficients for a mapping for a fixed projection of the pixel image for a fixed view.

3. The method of claim 1, wherein the step (b) of calculating, further comprises the step of computing a variable mapping for a moving viewer or projection relative to the video image system.

4. The method of claim 1, wherein the step (c) of determining further comprises the step of determining an edge of the highest priority face for a projector space span.

5. The method of claim 4, wherein the step of determining an edge, further comprises the steps of:
    (a) identifying data for a face, the data representative of an edge of a face in viewer space, each edge having a starting and a terminating vertex and a slope;

(b) locating the edge vertices in viewer space coordinates;
(c) transforming the edge vertices from viewer space to projector space for defining a starting projector space span and a terminating projector space span for an edge of the face;
(d) transforming the projector space span corners to viewer space span corners;
(e) computing a perpendicular distance in viewer space from the edge of the face to the viewer space span corners;
(f) determining from the viewer space distance a subsequent projector space span intersected by the edge of the face;
(g) storing in a memory each projector space span intersected by the edge;
(h) storing where the edge intersects the span boundaries in projector space;
(i) repeating step (d) of transforming through step (h) of storing until the last edge of the face is processed; and
(j) repeating step (a) of identifying through step (c) of transforming using a next face, until all the faces are processed.

6. The method of claim 5, wherein the step (f) of determining further comprises the step of searching along the edges of a face in a clockwise direction, beginning with a first edge of a face, for each span that an edge of a face passes through.

7. The method of claim 5, wherein the step (e) of computing a perpendicular further comprises the steps of:
(a) inputting, into the address lines of a read only memory, data representative of the slope of an edge and the endpoints;
(b) calculating the perpendicular distance from the corner of each span according to the formula $D=LO+LI*I+LJ*J$, where:
D is the perpendicular distance from a point (I,J) to an edge;
LO is an initial predetermined distance from a fixed reference point such as I=0 and J=0;
LI is the cosine of the edge slope; and
LJ is the sine of the edge slope; and
(c) outputting, from the data lines of the read only memory, data representative of the perpendicular distance from the corner of a span to an edge.

8. The method of claim 5, further comprising the steps of:
(a) determining a projector space span to be processed based upon data representative of the area covered by previously processed faces;
(b) recalling from memory the edges of the highest priority non-processed face intersecting a projector space span;
(c) determining the portions of the span covered by the face defined by the recalled edges; and
(d) repeating steps (a) of determining through step (c) of determining until all spans are covered or until all faces are processed.

9. The method of claim 8, wherein step (c) of determining the portions of the span further comprises the steps of:
(a) recalling from memory where the edge intersects the span boundaries in projector span;
(b) calculating new edge coefficients for the projector space span;
(c) determining a pixel of a projector space span intersected by an edge of a face;
(d) dividing the pixel into a plurality of subpixel areas;
(e) computing a distance from the center of each pixel area to the edge;
(f) determining the area of the subpixel areas covered by the face bounded by the edge;
(g) computing a weight for each subpixel area from the area covered by the face and the color of the face;
(h) repeating step (d) of dividing through step (g) of computing for each edge through the pixel;
(i) summing the weighted values for each pixel;
(j) generating a color for each pixel corresponding to the summed weighted values; and
(k) repeating step (c) of determining through step (h) of generating for each pixel intersected by an edge in the span.

10. The method of claim 9, wherein the step (i) of summing further comprises the steps of:
(a) receiving data representative of a translucency of a face in a subpixel area;
(b) summing the translucency of the subpixel area of the face with the weighted value for the subpixel to obtain a translucency weighted value.

11. The method of claim 10, further comprising the step of receiving data representative of a translucency of a face in a subpixel area based upon a programatic event representative of smoke, fog, environmental events, and events characteristic of simulated warfare.

12. The method of claim 9, wherein the step (e) of computing a distance from the center of each pixel area, further comprises the step of computing the distance from the center of a subpixel area to the edge by bilinear interpolation of the distances from the corners of the pixel to the edge.

13. The method of claim 9, wherein the step (f) of determining the area of the subpixel areas, further comprises the step of determining the subpixel areas assigned to the face as a function of the distance to the edge and slope of the edge.

14. The method of claim 9, wherein the step (e) of computing a distance from the center of each pixel area, further comprises the steps of:
(a) inputting the distances from each pixel area to the edge, and the edge slope, into a read only memory having address lines for input and memory lines for output;
(b) calculating the perpendicular distance from the corner of each span according to the formula $D=LO+LI*I+LJ*J$, where:
D is the perpendicular distance from a point (I,J) to an edge;
LO is an initial predetermined distance from a fixed reference point such as I=0 and J=0;
LI is the cosine of the edge slope; and
LJ is the sine of the edge slope; and
(c) determining the subpixel areas assigned to the face from the distance to the edge and the slope of the edge; and
(d) outputting the subpixel areas assigned to the face on the memory lines of the rear only memory.

15. The method of claim 14, further comprising the step of determining the accuracy of a subpixel area assigned to the face by a total area accuracy of at least one-half subpixel area.

16. The method of claim 15, further comprising the step of determining the accuracy of a subpixel area assigned to the face by a positioned accuracy of at least one subpixel.

17. The method of claim 9, wherein the step (g) of computing, further comprises the step of computing a weight for each subpixel area equal to the area covered by a face times the color.

18. The method of claim 9, the step (i) of summing further comprises the step of receiving data representative of a translucency of a face in a subpixel area based upon input from an external logic means.

19. The method of claim 1, wherein the step (h) of transferring, further comprises the steps of:
   (a) receiving data for a pixel, the data including a haze control, an illumination control and a texture control;
   (b) computing a color contribution for the pixel image data from the data and the previous pixel image data; and
   (c) transferring the color contribution of the pixel image data to the video display.

20. In an image generating system of the type for converting digital data into a sequence of display frames of image data in projector space suitable for display on a video image system in viewer space, the image system forming a display by individually illuminating each of a plurality of color pixels, each of the frames of image data defining a plurality of faces and each of the frame being divided into a plurality of spans, including an electronic control means for converting the digital data, a method for correcting for geometric distortion and optical distortion comprising the steps of:
   (a) identifying data for a frame of display, the data defining face locations in viewer space, each of the faces associated with at least one span;
   (b) calculating transformation coefficients for mapping projector space span corners into viewer space;
   (c) determining a face to be processed for each span;
   (d) determining an area within a viewer space span covered by said face;
   (e) computing pixel image data representative of the pixels within the projector space span covered by said face;
   (f) repeating step (c) through step (f) until a last face is processed into pixel image data; and
   (g) transferring the pixel image data to the video image system.

21. The method of claim 20, wherein the step (b) of calculating, further comprises the step of computing a variable mapping for a moving viewer or projection relative to the video image system.

22. The method of claim 20, wherein the step (b) of calculating, further comprises the step of predetermining the transformation coefficients for a mapping for a fixed projection of the pixel image for a fixed view.

23. The method of claim 22, wherein the step (c) of determining further comprises the step of determining an edge of the highest priority face for a projector space span.

24. The method of claim 23, wherein the step of determining an edge, further comprises the steps of:
   (a) identifying data for a face, the data representative of an edge of a face in viewer space, each edge having a starting and a terminating vertex and a slope;
   (b) locating the edge vertices in viewer space coodinates;
   (c) transforming the edge vertices from viewer space to projector space for defining a starting projector space span and a terminating projector space span for edge of the face;
   (d) transforming the projector space span corners to viewer space span corners;
   (e) computing a perpendicular distance in viewer space from the edge of the face to the viewer space span corners;
   (f) determining from the viewer space distance a subsequent projector space span intersecting by the edge of the face;
   (g) storing in a memory each projector space span intersected by the edge;
   (h) storing where the edge intersects the span boundaries in projector space;
   (i) repeating step (d) of transforming through step (h) of storing until the last edge of the face is processed; and
   (j) repeating step (a) of identifying through step (c) of transforming using a next face, until all the faces are processed.

25. The method of claim 24, wherein the step (f) of determining further comprises the step of searching along the edges of a face in a clockwise direction, beginning with a first edge of a face, for each span that an edge of a face passes through.

26. The method of claim 24, wherein the step (e) of computing a perpendicular distance further comprises the steps of:
   (a) inputting, into the address lines of a read only memory, data representative of the slope of an edge and endpoints;
   (b) calculating the perpendicular distance from the corner of each span according to the formula $D=LO+LI*I+LJ*J$, where:
      D is the perpendicular distance from a point (I,J) to an edge;
      LO is an initial predetermined distance from a fixed reference point such as I=0 and J=0;
      LI is the cosine of the edge slope; and
      LJ is the sine of the edge slope;
      and
   (c) outputting, from the data lines of the read only memory, data representative of the perpendicular distance from the corner of a span to an edge.

27. The method of claim 24, further comprising the steps of:
   (a) determining a projector space span to be processed based upon data representative of the area covered by previously processed faces;
   (b) recalling from memory the edges of the highest priority non-processed face intersecting a projector space span;
   (c) determining the portions of the span covered by the face defined by the recalled edges; and
   (d) repeating steps (a) of determining through step (c) of determining until all spans are covered or until all faces are processed.

28. The method of claim 27, wherein step (c) of determining the portions of the span further comprises the steps of:
   (a) recalling from memory where the edge intersects the span boundaries in projector span;
   (b) calculating new edge coefficients for the projector space span;
   (c) determining a pixel of a projector space span intersected by an edge of a face;

(d) dividing the pixel into a plurality of subpixel areas;
(e) computing a distance from the center of each pixel area to the edge;
(f) determining the area of the subpixel areas covered by the face bounded by the edge;
(g) computing a weight for each subpixel area from the area covered by the face and the color of the face;
(h) repeating step (d) of dividing through step (g) of computing for each edge through the pixel;
(i) summing the weighted values for each pixel;
(j) generating a color for each pixel corresponding to the summed weighted values; and
(k) repeating step (c) of determining through step (h) of generating for each pixel intersected by an edge in the span.

29. The method of claim 28, wherein the step (i) of summing further comprises the steps of:
(a) receiving data representative of a translucency of a face in a subpixel area;
(b) summing the translucency of the subpixel area of the face with the weighted value for the subpixel to obtain a translucency weighted value.

30. The method of claim 29, further comprising the step of receiving data representative of a translucency of a face in a subpixel area based upon a programatic event representative of smoke, fog, environmental events, and events characteristic of simulated warfare.

31. The method of claim 28, the step (i) of summing further comprises the step of receiving data representative of a translucency of a face in a subpixel area based upon input from an external logic means.

32. The method of claim 28, wherein the step (e) of computing a distance from the center of each pixel area, further comprises the step of computing the distance from the center of a subpixel area to the edge by bilinear interpolation of the distances from the corners of the pixel to the edge.

33. The method of claim 28, wherein the step (f) of determining the area of the subpixel areas, further comprises the steps of determining the subpixel areas assigned to the face as a function of the distance to the edge and slope of the edge.

34. The method of claim 28, wherein the step (e) of computing a distance from the center of each pixel area, further comprises the steps of:
(a) inputting the distance from each pixel area to the edge, and the edge slope, into a read only memory having address lines for input and memory lines for output;
(b) calculating the perpendicular distance from the corner of each span according to the formula $D = LO + LI*I + LJ*J$, where:
D is the perpendicular distance from a point (I,J) to an edge;
LO is an initial predetermined distance from a fixed reference point such as I=0 and J=0;
LI is the cosine of the edge slope; and
LJ is the sine of the edge slope;
and
(c) determining the subpixel areas assigned to the face from the distance to the edge and the slope of the edge; and
(d) outputting the subpixel areas assigned to the face on the memory lines of the read only memory.

35. The method of claim 34, further comprising the step of determining the accuracy of a subpixel area assigned to the face by a total area accuracy of at least one-half subpixel area.

36. The method of claim 36, further comprising the step of determining the accuracy of a subpixel area assigned to the face by a positioned accuracy of at least one subpixel.

37. The method of claim 28, wherein the step (g) of computing, further comprises the step of computing a weight for each subpixel area equal to the area covered by a face times the color.

38. The method of claim 20, wherein the step (h) of transferring, further comprises the steps of:
(a) receiving data for a pixel, the data including a haze control, an illumination control and a texture control;
(b) computing a color contribution for the pixel image data from the data and the previous pixel image data; and
(c) transferring the color contribution of the pixel image data to the video display.

* * * * *

UNITED STATES PATENT AND TRADEMARK OFFICE
CERTIFICATE OF CORRECTION

PATENT NO. : 4,714,428

DATED : 12/22/87

INVENTOR(S) : William Marvin Bunker, et al

It is certified that error appears in the above-identified patent and that said Letters Patent is hereby corrected as shown below:

Column 21, Line 31, insert --distance-- after "perpendicular".

Column 22, Line 45, delete "distances" and substitute --distance-- therefor; Column 22, Line 62, delete "rear" and substitute --read-- therefor.

Column 24, Line 33, insert --the-- after "and".

Column 25, Line 43, delete "steps" and insert --step-- therefor.

Column 26, Line 27, delete "36" and substitute --35-- therefor.

Signed and Sealed this

Sixteenth Day of August, 1988

Attest:

DONALD J. QUIGG

Attesting Officer

Commissioner of Patents and Trademarks